United States Patent [19]

DiFrank

[11] Patent Number: 4,693,210

[45] Date of Patent: Sep. 15, 1987

[54] QUICK CHANGE FOUNTAIN

[75] Inventor: Frank J. DiFrank, Toledo, Ohio

[73] Assignee: Owens-Illinois, Inc., Toledo, Ohio

[21] Appl. No.: 856,323

[22] Filed: Apr. 28, 1986

[51] Int. Cl.$^4$ .............................................. B05C 1/02
[52] U.S. Cl. .................................... 118/259; 118/231; 118/261
[58] Field of Search ...................... 118/259, 231, 261

[56] References Cited

U.S. PATENT DOCUMENTS 4,574,020 3/1986 Fosnaught .................... 118/259 X

Primary Examiner—John P. McIntosh
Attorney, Agent, or Firm—H. G. Bruss

[57] ABSTRACT

In the application of a solvent to a plastic label carried on the surface of a vacuum drum, the solvent for the plastic label is transferred from a gravure roll to the label at finite areas on the label so that the label can adhere to the bottle to be labeled and to itself to form a complete sleeve label. The gravure roll is supplied from a fountain that is held against the roll under a spring force. The fountain is in the form of a plastic block which has a face that has several undercut channels in one of which the solvent is supplied and with the others acting as doctor channels to carry away any excess solvent from the roll surface.

The fountain block is held by a vertical support plate that, in turn, is held to the surface of a vertical mounting plate by a quick release toggle clamp. The support plate and the spring biased fountain are released by the toggle clamp so the fountain can be removed without requiring any tools for easy inspecting and clearing of any labels that may become adhered to the gravure roll with a minimum of time involved. If it is necessary to change the fountain, only a pair of supply and return hoses to the fountain need to be changed and the new fountain easily and quickly replaced. The toggle clamp and the mounting system serve as the quick disconnect fountain mounting arrangement.

7 Claims, 5 Drawing Figures

QUICK CHANGE FOUNTAIN

BACKGROUND OF THE INVENTION

In the production of bottles with thermoplastic sleeve labels that are heat shrunk about the bottle sidewall, shoulder and heel areas, it has been the practice to form the sleeves from label blanks that are wound on a cylindrical mandrel with the trailing edge overlapping the leading edge. The overlap is engaged by a heated sealing bar and forms a heat sealed seam extending the height of the sleeve. The sleeve is then telescoped over the bottle and the assembled sleeve and bottle are passed through a heat tunnel with bottle and sleeve being rotated to expose the full circumference of the sleeve to the heat to evenly shrink the label and cause it to conform to the exterior configuration of the bottle. The sleeves may be positioned with their lower margins below the bottom of the bottles, in which case the sleeve will be shrunk over the heel and the bearing surface as well. Such a process and apparatus is disclosed in U.S. Pat. No. 3,802,942 issued Apr. 9, 1974.

A more recent U.S. Pat. No. 4,574,020, issued Mar. 4, 1986, discloses a method and apparatus for applying heat shrinkable, thermoplastic wrap-around labels to containers by providing a web of foamed polystyrene sheet material which is subsequently cut into label lengths equal to the circumference of the containers plus an overlap seam area. The web of material is held to the surface of a rotating vacuum drum and, as the drum rotates about its vertical axis, the web is cut into label length. With the label adhering to the vacuum drum surface, the outer surface of the web is brought into contact with a rotating gravure roll which has a gravure pattern that contains a solvent for the material and will apply the solvent to finite areas of the leading and trailing edge of the label. With the solvent applied to the label, the label is brought into rolling contact with a container where the leading edge of the label adheres to the container and with the container rolled along the label surface, the trailing edge will overlap and become sealed to the leading edge by the solvent action.

In the operation of the above system, one of the most critical aspects is the precise transfer of the solvent from the gravure roll to the surface of the label. If the gravure roll surface and the label surface do not make proper contact, there will not be sufficient solvent applied to the label in order to dissolve the label so as to make it adhere to the bottle or container as it comes into contact therewith and transfers thereto. Likewise, as the label trailing edge overlaps the leading edge, it is absolutely necessary that the trailing edge will have received a full height strip of solvent applied thereto so that a complete overlap seam will be formed. This seam has to be complete since subsequent heat shrinkage of the label about the bottle will open the seam up and produce a defective label if the seam is not sealed throughout its full height.

The label carrying vacuum drum has sets of raised areas or pads on its periphery which will underlie the leading and trailing edges of the label and the rotating gravure roll will be set to engage the label at these critical points in the relative rotation of the drum and roll. The gravure roll is normally mounted on a platform which is shiftable about a vertical axis which is parallel to the axis of the roll. Such a gravure roll mounting system is disclosed in copending U.S. patent application Ser. No. 856,241, filed of even date.

In order to insure that the solvent is properly applied, the gravure roll must carry a sufficient quantity of solvent on its surface pattern. The use of a vertical fountain biased against the gravure roll is shown in U.S. Pat. No. 4,574,020, issued Mar. 4, 1986. This patent discloses a fountain which requires considerable down time in order to change the fountain. It is necessary to change fountains as they become worn or become contaminated with extraneous materials.

With the foregoing in view, it is an object of the present invention to provide a solvent applicating fountain which can be easily and quickly exchanged for one in service when required, resulting in a minimum of disruption in the operation of the labeling machine.

The quick change fountain of the invention is mounted on a vertical plate which may be removed from its holder and replaced by another fountain mounted on a similar plate without requiring the use of any tools to effect the mounting.

Other and further objects will be apparent from the following description taken in conjunction with the attached sheets of drawings.

Figure 1:
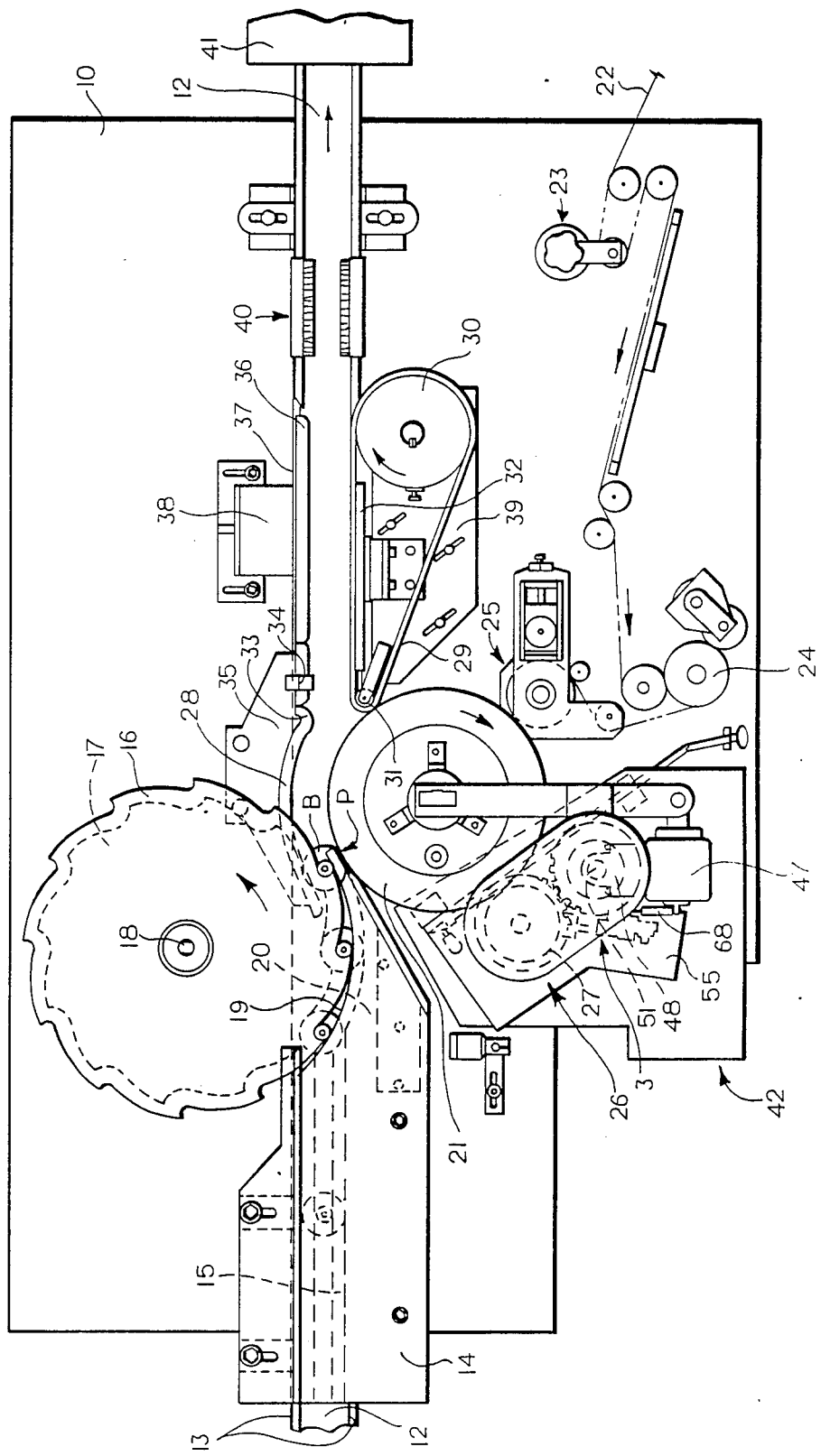
FIG. 1 is a schematic plan view of a system for wrapping shrink labels about bottles incorporating the quick change fountain of the invention for the solvent applicating gravure roll.

DETAILED DESCRIPTION OF THE DRAWINGS with particular reference to FIG. 1, the following is a general description of the operation of the overall labeling system. A horizontal supporting table 10 of generally rectangular configuration serves to support the mechanisms and is itself supported above the floor by a plurality of vertical legs (not shown). Mounted above the table and extending generally across the length of the table is a conveyor generally designated 11. The conveyor 11 has a horizontally moving upper surface 12 which is driven in the direction of the arrow shown thereon. Containers or bottles B to be labeled are supplied at the left hand end of the conveyor 11 in an upright attitude on the surface 12 of the conveyor. With the conveyor surface 12 moving in the direction of the arrow thereon, the bottles will be carried from the left to the right as viewed in FIG. 1. The bottles are guided by rails 13 which extend along either side of the conveyor 12. An overhead member 14 is shown which is provided in its under surface with a guiding slot 15 within which the finish or neck of the bottles will be guided. As can be seen when viewing FIG. 1, the bottles moving from the left approach a pair of vertically spaced, pocketed starwheels 16 and 17 which are both mounted to a vertical axle 18 which is rotated in a counterclockwise direction as viewed in FIG. 1. The starwheel 16 has 12 pockets circumferentially spaced about the circumference thereof which pockets are adapted to engage the neck of the bottles being handled and the starwheel 17 is provided with a like number of pockets that are of somewhat larger dimension and are adapted to engage the sidewall of the bottles being handled.

An arcuate guide 19 has a contour which is coaxial with respect to the axle 18 and serves to hold the necks of the bottles at a precise distance from the axle 18 of the starwheel 16. In addition, there is a lower arcuate guide 20 which is mounted at a height generally the same as the height of the sidewall or body engaging starwheel 17 to maintain the bottles B with their axes vertical during the movement of the bottles by the starwheels 16 and 17. When a bottle reaches the position generally designated P, the side of the bottle B will approach, generally tangentially, the circumferential periphery of a vacuum drum 21. The vacuum drum 21 is a generally cylindrical member having a height somewhat greater than the height of a label which is to be applied to the bottles B. The drum 21 will have a plurality of vacuum passages opening through the surface thereof to, in effect, grip the individual labels supplied thereto and to convey the labels to the position P. The labels may be formed from a web 22 of foam-film polystyrene which may be pre-printed and which will be coming from a supply (not shown) at the right through a tension takeup device 23. After passing the tension compensating device 23 the web 22 will pass around a driven feed roller 24 and then to a label cutting and handling system generally designated 25. The label cutting device 25 cuts the label at a predetermined point in its length with the leading edge of the label being brought into peripheral engagement with the drum 21. The label will adhere to the outer surface of the drum 21 and move in the direction of the arrow on the drum 21 to carry the label past a glue or solvent applying station 26 where a solvent transfer gravure roll 27 will apply the solvent to selected, defined areas of the label. The gravure roll 27 is driven by intermeshing gears generally in a counterclockwise direction, as viewed in FIG. 1, and timed to present the solvent to the leading and trailing edges of the label which is transported by the vacuum drum 21.

At the point P the leading edge of the label will engage the sidewall of the bottle B and the leading edge of the label will become adhered to the bottle. From this point on, the bottle will be held against the surface of the drum by a primary backup pad 28 which is mounted to the surface of the table 10 by a bracket 35. The backup pad 28 may be formed of a resilient foam material such as foam rubber so that it will effectively hold the bottle B against the surface of the drum and as the drum continues to rotate the bottle will be effectively rolled along the surface of the label carried on the surface of the vacuum drum 21.

As previously described, the label carried by the drum 21 will have a vertical, full height, line of solvent applied to the rrailing edge thereof and the trailing edge of the label will overlap the leading edge and adhere thereto to form an overlap seam. The container with the label applied continues to be guided by the primary backup pad 28 until it reaches a secondary roll-on belt 29. The secondary roll-on belt 29 passes about a drive roll 30 which is driven in the direction of the arrow shown thereon. The belt 29 also passes about a relatively small diameter inlet roll 31. A stationary, vertical backup surface 32 maintains the belt 29 in a fairly straight path between the drive roll 30 and the inlet roll 31. The bottle B will have the label completely wrapped thereabout prior to the movement of the bottle into engagement with the secondary roll-on belt 29. The primary backup pad 28 has an area 33 which tends to maintain the bottle in contact with the vacuum drum 21 until such time as the bottle engages the secondary roll-on belt 29. This provides a positive drive for the bottle so that when the bottle passes to the secondary roll-on belt, it will be rotated while moved along by the moving surface of the belt 29. The moving belt drives the rolling bottle so that the overlap seam of the label will contact a resilient pressing pad 34 which is mounted beyond the primary pad 28 on a bracket 35 which in turn is mounted to the table 10 as previously described.

A secondary backup pad is positioned in bottle engaging, diametrically opposed, position relative to the secondary roll-on belt 29. The pad 36 is also formed with a foam rubber or like resilient member mounted to a plate 37 which in turn is mounted by bracket 38 to the top of the table 10.

It perhaps should be pointed out also that the secondary roll-on belt 29 and its drive roll 30 and inlet roll 31 are both mounted on a mounting plate 39 which may be moved relative to the upper surface of the table 10, and thus be adjusted toward or away from the center line of the conveyor 12 to accommodate the mechanism for different size bottles. Likewise, the secondary backup pad 36 and the bracket 38 which supports it may be moved toward or away from the center line of the conveyor 12.

As can be seen when viewing FIG. 1, the bottles B, after passing between the secondary backup pad and the secondary roll-on belt, will be held back by the brush spacer, generally designated 40, and that the bottles are moved through the brush spacer 40 in surface-to-surface contact under the force created by the moving belt 29, until such time as the leading bottle clears the spacer 40, at which time the bottle is free to move at the speed of the conveyor 12 into a heat shrink oven 41. The bottles will leave the brush spacer at regular intervals depending upon the speed with which the label wrap machine is operating. It should be understood that the drum 21 and drive roll 30 are commonly driven.

Figure 2:
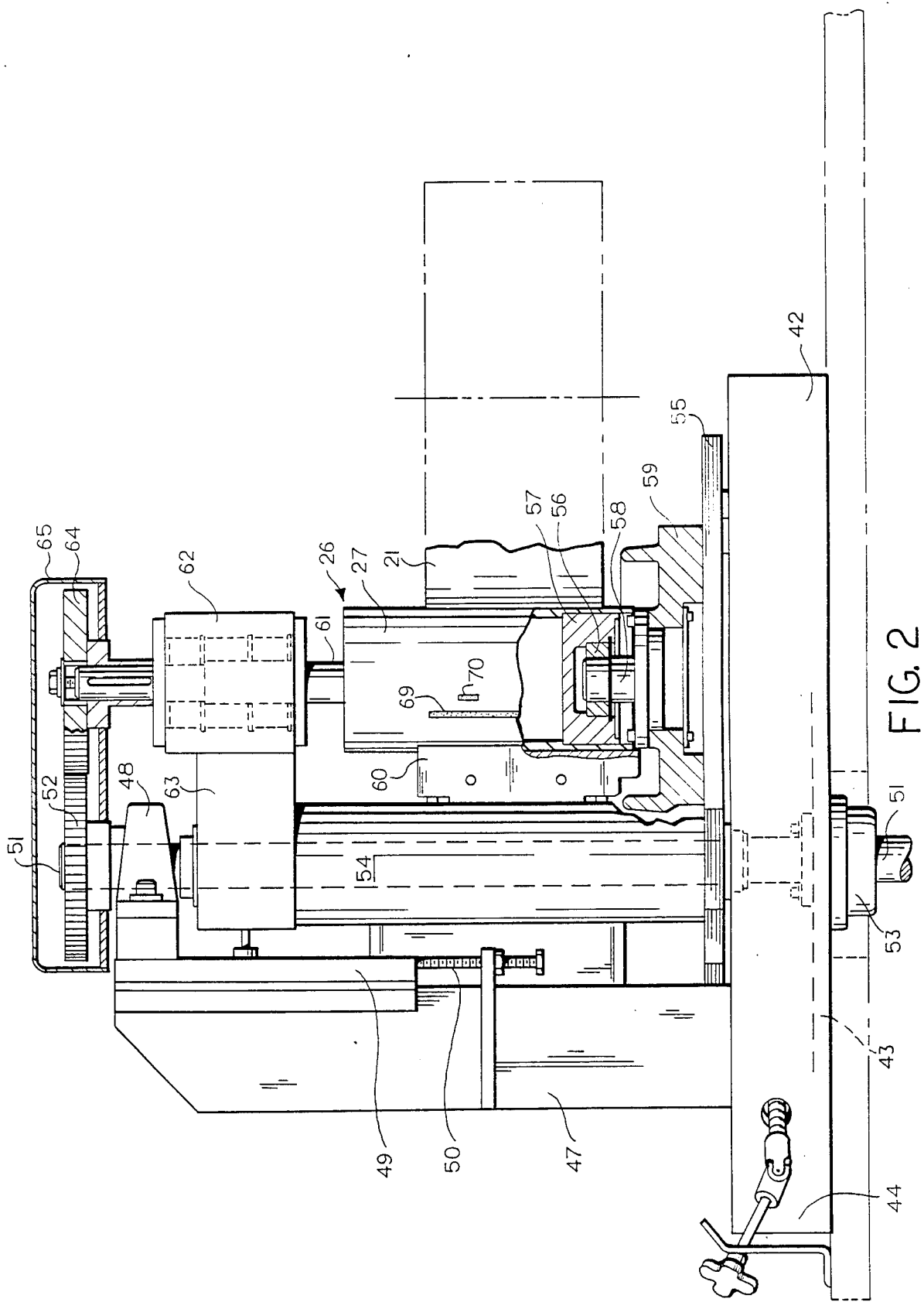
FIG. 2 is a side elevational view, on an enlarged scale, of the solvent apply station of FIG. 1.
Figure 3:
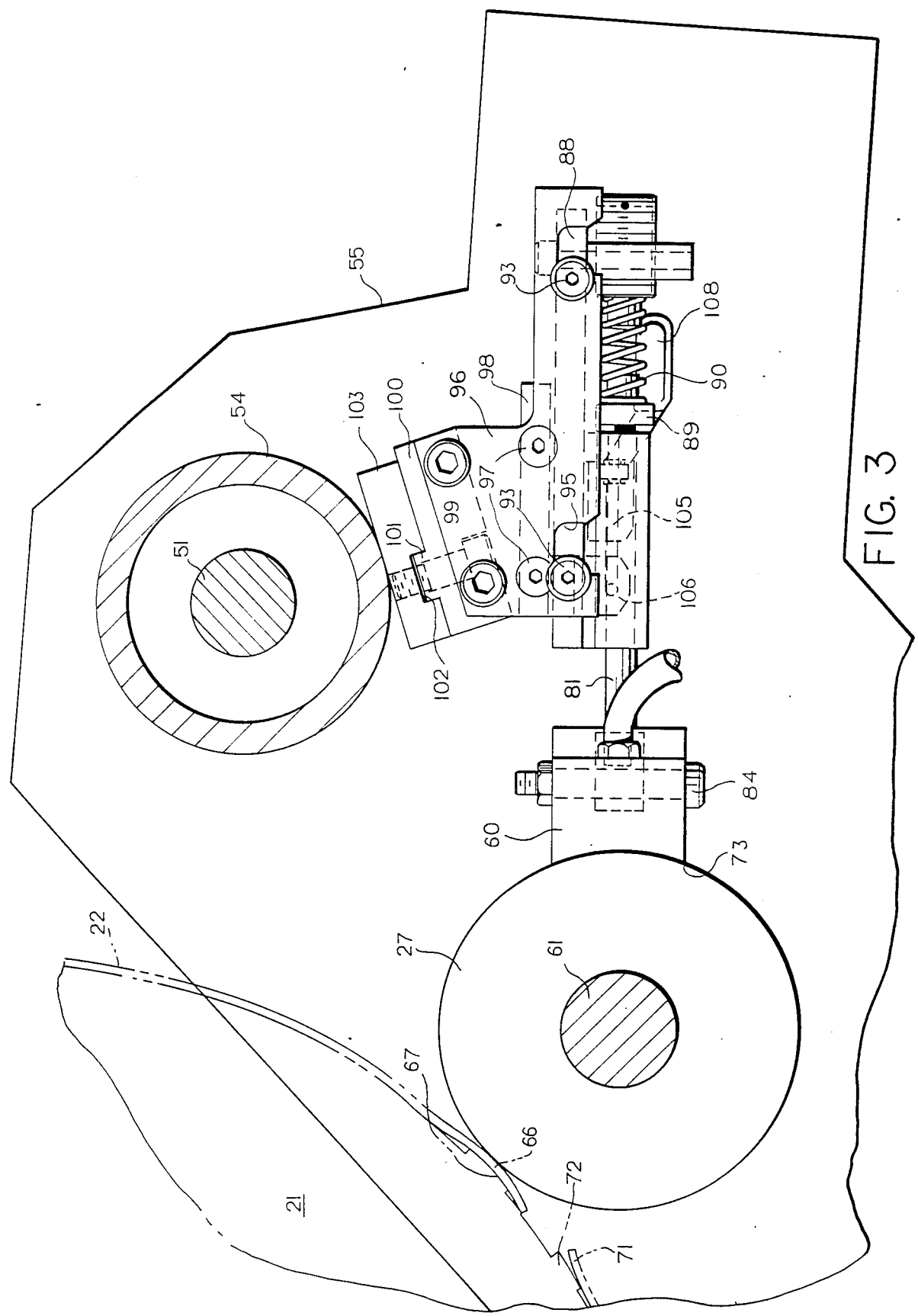
FIG. 3 is a partial plan view of the fountain and mounting arrangement of the invention on an enlarged scale looking in the direction of the arrow 3 on FIG. 1.
Figure 4:
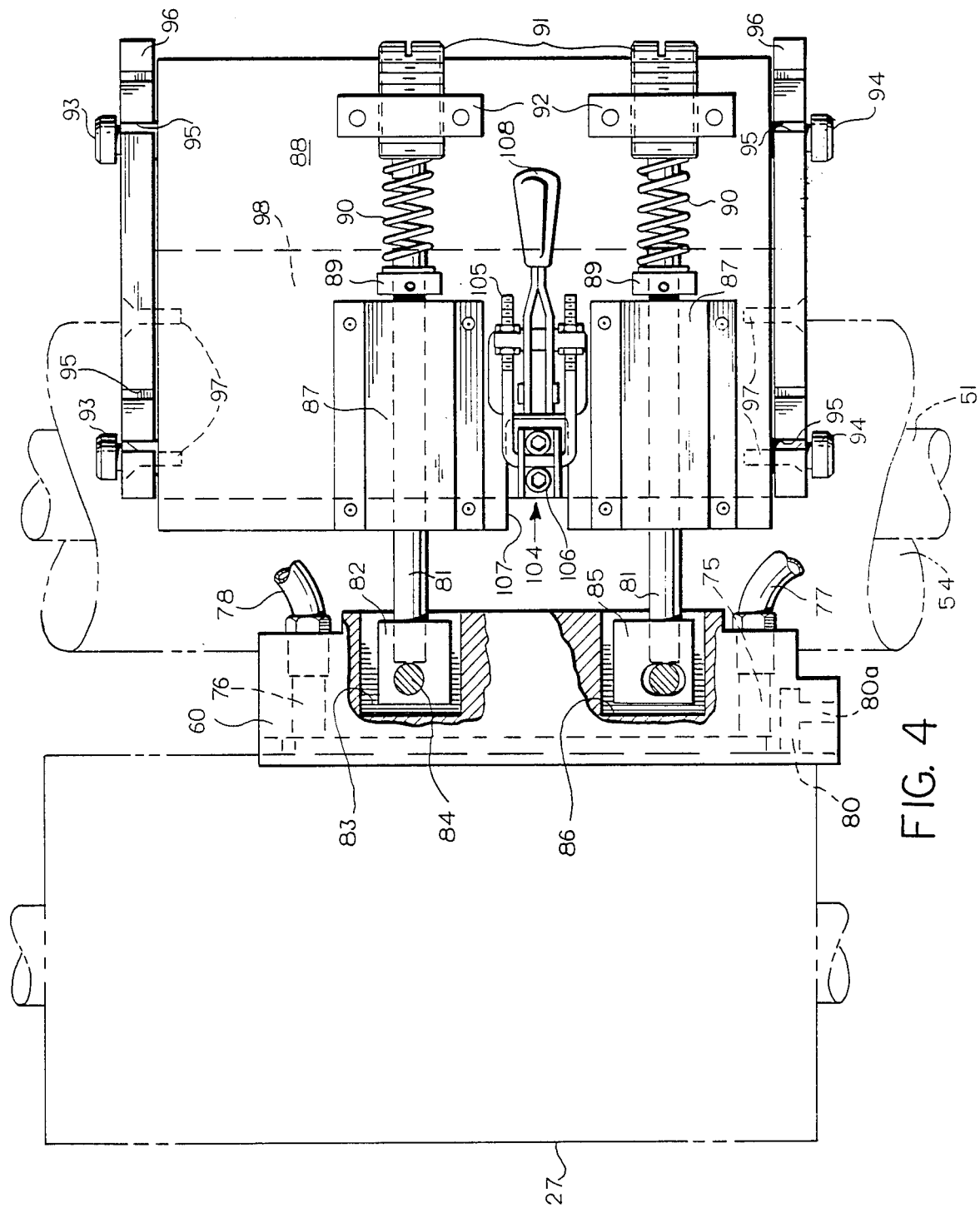
FIG. 4 is a side elevational view of the fountain and mounting of FIG. 3.
Figure 5:
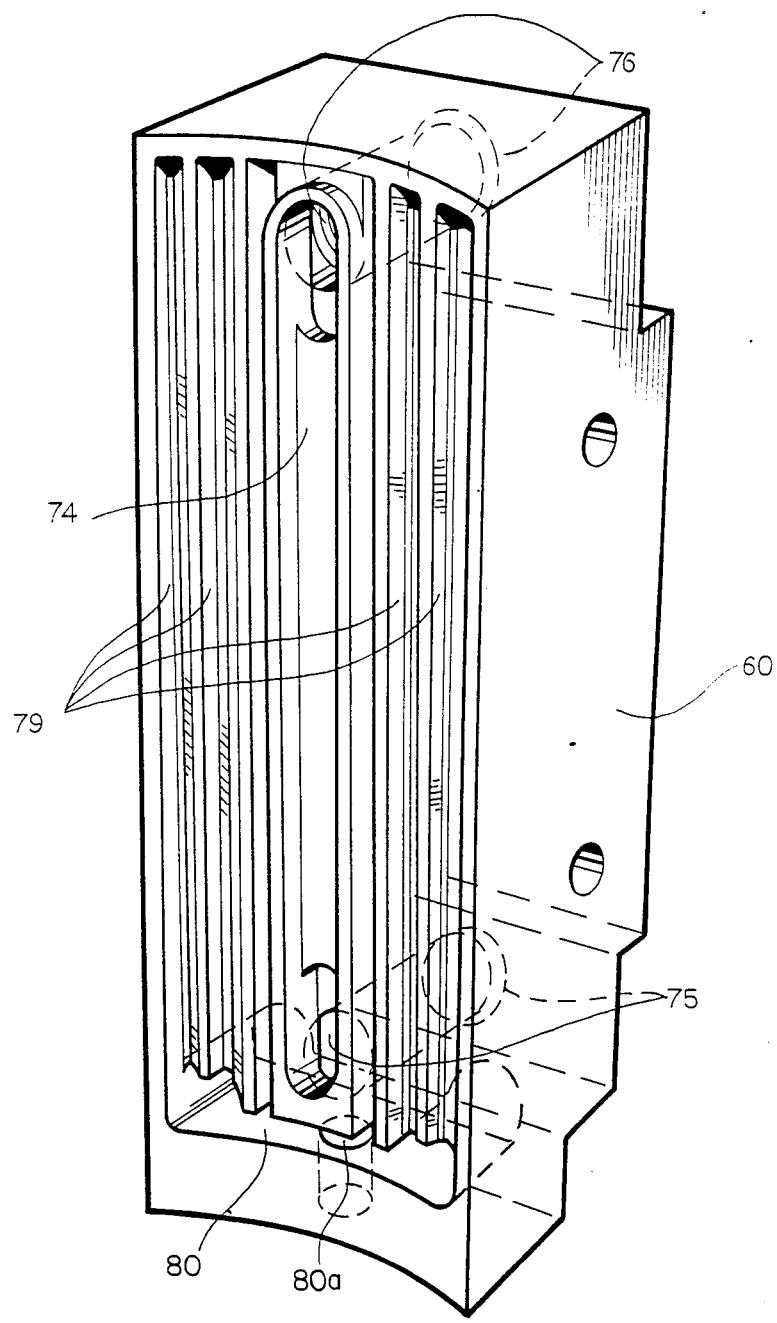
FIG. 5 is a front, perspective view of the fountain of the invention.

Turning to FIGS. 2-4, the particular gravure roll mounting and fountain will be described in detail. The solvent applying station 26 is supported by generally hollow, shallow base structure 42 resting on the top of the table 10. The base structure 42 comprises a horizontal bottom plate 43 with a peripheral, vertical wall 44 extending up from the plate 43. The wall 44 serves as an enclosure for an adjusting mechanism. A main support pedestal 47 extends vertically through the base 42, with the pedestal being fixed to the table 10. Extending outwardly, as seen in FIGS. 1 and 2, from the pedestal 47 is a support bracket 48 that is mounted on a vertical slide 49 which is vertically adjustable relative to the pedestal by an adjusting bolt 50. The bracket 48 supports the upper end of a vertical shaft 51. The shaft 51 has a spur gear 52 mounted to its upper end. The lower end of the shaft 51 extends through a lower bearing housing 53 which is mounted on the bottom plate 43. The shaft extends down through an opening in the table and is driven by a drive means (not shown).

Surrounding the shaft 51 is a vertical sleeve 54 with suitable intermediate bearings to permit the sleeve to rotate about the axis of the shaft 51. The lower end of the sleeve is fixed to a horizontal platform 55. The platform 55 is likewise movable in its horizontal plane about the axis of the shaft 51. The platform 55 supports a bottom bearing 56 for the gravure roll 27. The bearing 56 is held between an inner bottom closing member 57 and a vertical stub shaft 58. The stub shaft is mounted on the center of an annular, fluid collecting chamber 59 which is positioned on the platform in generally surrounding relationship to the bottom of the gravure roll. The outer surface of the gravure roll is supplied with a solvent from a vertical fountain 60 and any excess solvent is free to flow down the roll surface into the chamber 59 from which it may be recycled to the fountain.

The gravure roll 27 is rotated by a drive shaft 61 which extends vertically above the roll through a bearing housing 62 which surrounds the shaft. The bearing housing 62 is supported, in the position shown in FIG. 2, by an arm 63 which extends from the housing 62 to the upper area of the sleeve 54. The upper end of the shaft 61 extends through the bearing housing and has a spur gear 64 fixed thereto. The gear 64 is in mesh with the gear 52 on the drive shaft 51. Thus the rotation of the drive shaft 51 will rotate the gravure roll 27. A cover 65 is shown overlying both spur gears.

As previously explained, the drum 21 carrying the labels is rotated so the labels will contact the gravure roll 27 and receive the solvent from the gravure roll. In FIG. 3 the gravure roll 27 is contacting the leading edge 66 of the label 22. The leading edge 66 is held to a raised area 67 of the drum 21. The gravure roll 27 is biased in the direction of the drum 21 by horizontally positioned piston motor 68 whose casing is mounted to the side of the pedestal 47 (See FIG. 1) and its piston rod is coupled to a radial arm fastened to the sleeve 54.

As viewed in FIGS. 1 and 3, platform 55 supporting the gravure roll 27 is biased about the axis of the sleeve 54 toward the drum 21. In order to accurately control the spacing between the outer surface of the roll and the surface of the drum an adjustable stop is provided. The details of this adjustment mechanism is disclosed in copending U.S. patent application Ser. No. 856,241, filed 4/28/86.

In the prior art systems the adjustment was in the manner of a threaded bolt engaging the side of the platform 55 fairly near the axis of the mounting shaft 51.

As shown in FIG. 2, the gravure roll 27 is essentially a smooth surfaced, cylindrical metal roll which is provided with spaced apart finite areas 69 and 70 engraved thereon. The area 69 will extend the full height of the label 22 carried by the drum 21 so that a full height line of solvent will be applied to the trailing edge 71 of the label. In FIG. 3, the trailing edge of a label is illustrated as being supported on a raised area 72 on the surface of the drum 21. The engraved area 70 of the gravure roll is less extensive than the area 69, and a second area (not shown) of essentially the same size as area 70 is formed on the surface of the roll vertically below area 70 about one-third the distance up from the bottom of the roll 27. The areas 70 are those areas of the gravure roll which are brought into contact with the leading edge 66 of the label. These areas 70 provide a small amount of solvent to the label at two vertically spaced areas which will be sufficient to cause the label to adhere to the bottle at point "P" in the movement of the bottle through the labeling machine.

The fountain 60 is formed from an ultra high molecular weight polymer member which has its forward face 73 machined to exactly match the curvature of the gravure roll 27. Recessed in the face 73 is a vertical channel 74. An inlet passage 75 extends through the fountain and opens into the bottom of said channel 74. An outlet passage 76 extends from the upper end of the channel 74 through the back of the fountain. Hoses 77 and 78 are connected to the inlet and outlet passages. On either side of the channel 74, the face 73 has a pair of vertical grooves 79 cut therein with the grooves extending down below the bottom of the channel 74. A generally horizontal chamber 80 is cut into the face of the fountain and is in communication with the lower end of the grooves 79. The chamber 80 has a bottom drain hole 80a through which any excess solvent that accumulates in the grooves 79 may pass to the chamber 59. This solvent will be available for recycling to the inlet to the fountain from a reservoir (not shown).

The grooves 79 are separated by ribs which serve as doctor blades to effectively limit the solvent on the gravure roll to the engraved areas 69 and 70. The fountain head 60, as shown in FIGS. 3 and 4, is held in contact with the roll 27 by a pair of generally horizontal, vertically spaced, push rods 81. The upper push rod is held in a top clevis 82 which is held in a recess 83 in the fountain head 60 by a bolt 84. In a similar fashion the lower push rod is held in a lower clevis 85 which is pivotally held in a recess 86 in the head 60. Both of the rods 81 extend through and are supported by linear bearings 87. These bearings may be Thomson type "TWN" fixed diameter twin pillow block bearings manufactured by Thomson Industries, Inc., Manhasset, N.Y. The bearings are mounted on the vertical surface of a clamp plate 88.

The push rods 81 extend through the bearings 87 and have set screw collars 89 clamped to their extending ends. Compression springs 90 are seated against the collars 89 and have their other ends abutting spring screws 91 which are threaded through spring adjusting blocks 92. The blocks 92 are also mounted to the vertical surface of the clamp plate 88. It can be readily seen that the force exerted by the springs 90 in holding the fountain block 60 against the gravure roll may be selectively adjusted by turning the screws 91.

The clamp plate 88 has a pair of shoulder bolts 93 which extend from the upper edge thereof. Similarly a pair of shoulder bolts 94 extend from the bottom edge as well. The shoulder bolts 93 and 94 are adapted to engage horizontal angle slots 95 formed in the forward edge of upper and lower base holders 96. The base holders 96 are fastened at 97 to a generally vertical sub-base 98 in the form of a vertical plate whose top and bottom ends fit between the two base holders 96. The base holders 96 are also bolted at 99 to a base block 100. The base block 100 which is essentially the same height as the sub-base 98 is formed with a vertical rib 101. The rib 101 is adapted to be received in a vertical slot 102 formed in the facing surface of an adapter bracket 103 which is fixed to the support sleeve 54. The base block 100 is bolted to the adapter bracket.

The clamp plate 88 and the fountain support structure mounted thereon may be easily replaced by another fountain support when it is desirable to change fountains quickly as explained previously. The quick change feature is provided by a toggle clamp 104. The clamp may be a U-bolt pull type, manufactured by the De-STA-CO Div. of Troy, Mich. This clamp consists of a U-bolt 105 that can swing over and engage a clasp 106. The clasp 106 is mounted to the surface of the sub-base 98 and extends through an opening 107 in the clamp plate 88. The body of the clamp 104 is fixed to the surface of the clamp plate 88. Thus it can be seen that operation of the toggle clamp 104 by pulling the handle 108 away from the clamp plate 88 will move the U-bolt to the left, as viewed in FIG. 4, and clear the clasp 106. With the toggle clamp released, the plate 88 will be free to move to the right as viewed in FIGS. 3 and 4 with the shoulder bolts clearing the angle slots 95 in the base holders 96.

A replacement fountain may be introduced in the reverse manner by placing the new fountain 60 against the roll 27 and shoving the shoulder bolts 93 into the slots 95, engaging the U-bolt 105 over the clasp 106 and pushing the toggle clamp handle toward the plate 88.

All of these operations can be done without requiring the use of tools such as screw drivers or wrenches, as has been required in the past.

The foregoing constitutes the best mode contemplated by the inventor for carrying out the invention; however, obvious modifications may be resorted to without departing from the scope of the appended claims.

What is claimed:

1. A quick change fountain for the application of a solvent to the surface of a vertical gravure roll, comprising a vertical member extending parallel to but horizontally displaced from the axis of said gravure roll, mounting means extending from said vertical member and including a pair of vertically spaced, outwardly extending, horizontal base holders, a generally rectangular clamp plate having a vertical length approximately equal to the vertical spacing between said base holders, a pair of shoulder bolts extending out from the ends of said clamp plate, a pair of vertical angle slots extending through said base holders, said bolts adapted to seat within said angle slots, a pair of vertically spaced, horizontal shafts, linear bearings mounted on said clamp plate for supporting said shafts for horizontal reciprocation, spring means for biasing said shafts axially in one direction, a vertical fountain adapted to engage the surface of a roll, means for mounting said fountain to ends of said horizontal shafts to bias the fountain into engagement with the roll, and means connecting said clamp plate to said mounting means.

2. The apparatus of claim 1 further including a solvent inlet tube connected to the lower end of said fountain, an outlet tube connected to the upper portion of said fountain and a primary vertical slot in the face of said fountain extending from the inlet to the outlet.

3. The apparatus of claim 2 further including a plurality of secondary vertical slots on either side of said primary vertical slot, means interconnecting the lower ends of said plurality of secondary slots, and a bottom drain hole in said fountain in communication with said interconnecting means.

4. The apparatus of claim 1 wherein said spring means comprises a pair of threaded spring adjusting blocks mounted to said clamp plate, and a threaded spring screw mounted in each adjusting block.

5. The apparatus of claim 4, further including a set screw collar attached adjacent the end of each horizontal shaft and said spring extends between said collar and said spring screw, whereby the tension in said spring may be adjusted.

6. The apparatus of claim 1 wherein said shoulder bolts are held in forward ends of said angle slots by a toggle clamp and upon release of the toggle clamp the clamp plate well be moved relative to said base holders and the shoulder bolts back out of the slots for quick access to the fountain for cleaning or replacing.

7. The apparatus of claim 1 wherein said fountain comprises an elongated block, said block having a face thereof that is curved to match the external curvature of the gravure roll, an elongated, undercut slot in the face of said block, and threaded inlet and outlet connections in the back of said block in communication with the upper and lower ends of said elongated slot.

* * * * *